June 7, 1960  C. B. LEACH  2,939,748
DRIVE SHAFT CENTER BEARING SUPPORT
Filed Sept. 23, 1957
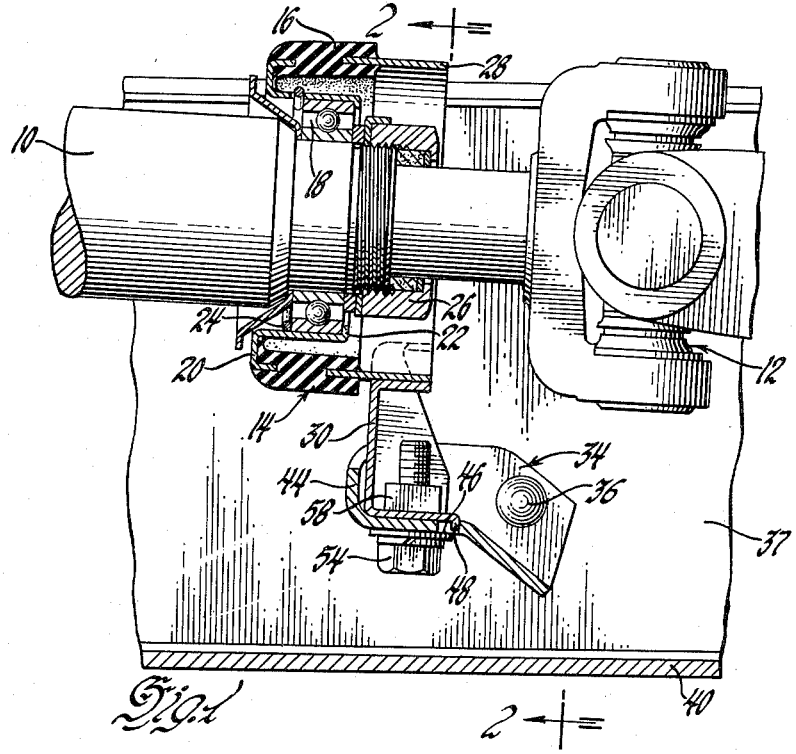
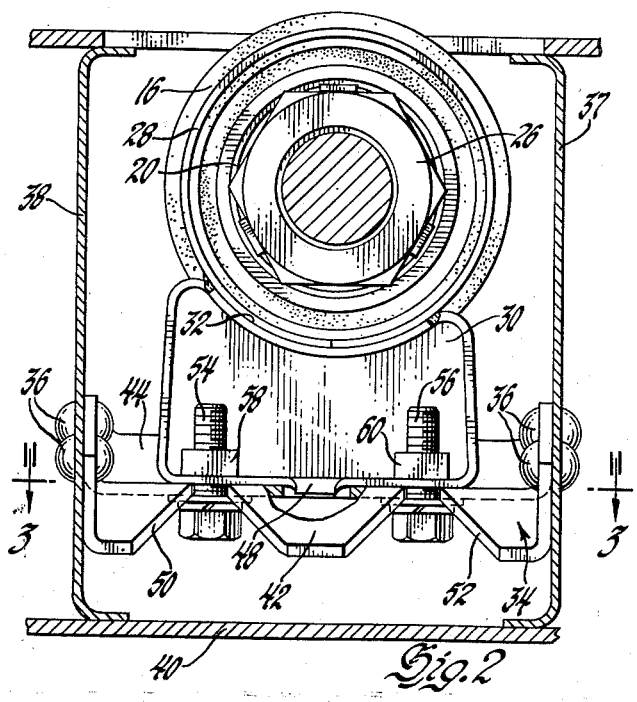
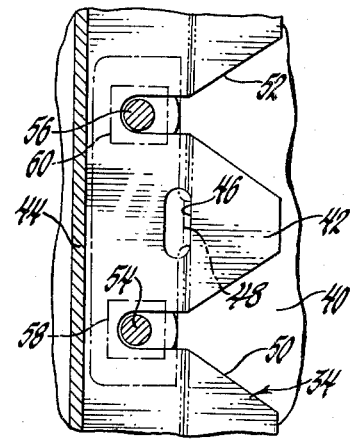
INVENTOR
Clayton B. Leach
BY
L. D. Burch
ATTORNEY

United States Patent Office 2,939,748
Patented June 7, 1960

2,939,748

DRIVE SHAFT CENTER BEARING SUPPORT

Clayton B. Leach, Pontiac, Mich., assignor to General Motors Corporation, Detroit, Mich., a corporation of Delaware Filed Sept. 23, 1957, Ser. No. 685,609

3 Claims. (Cl. 308—28)

This invention relates to drive shaft center bearing supports in general and more particularly to such supports as isolate against road and other vehicle noises being transmitted through the vehicle drive means and into the vehicle body.

Numerous different center bearing supports have been proposed for supporting two-piece vehicle drive shafts. Almost all of these are concerned with both the firm support of the shaft and the isolation of road noises that normally tend to be transmitted therethrough and into the vehicle body.

The present bearing support includes not only the aforementioned features, accomplished much more effectively than in the past, but also includes a noteworthy bumper stop feature to guard against excessive shaft deflection and an assembly feature which facilitates more expedient mounting of the bearing supporting member.

The presently proposed bearing support means comprises a resilient sleeve having the shaft receiving bearing member disposed in spaced concentric relation therein and secured to the resilient member at one end thereof. The other end of the resilient sleeve is secured to a support sleeve which includes a support member that is mounted on a receiving frame bracket. With the bearing member disposed within the resilient sleeve, the resilient sleeve is under shear loading during normal deflection and vibration of the shaft.

The proposed bearing support means also includes having one end of the resilient sleeve member disposed between the bearing member and the supporting sleeve member to act as a bumper stop against excessive deflection of the drive shaft member.

A further feature of the proposed bearing support means includes a support bracket and guide means whereby the center bearing mount may be readily mounted within the normally inaccessible center section of a vehicle frame.

In the drawings:

Figure 1 is a cut-away section of a vehicle frame showing the proposed drive shaft center bearing support means.

Figure 2 is a cross-sectional view of the drive shaft bearing support of Figure 1 taken substantially in the plane of line 2—2 and looking in the direction of the arrows thereon.

Figure 3 is a cut-away top view of the proposed bearing support as seen in the plane of line 3—3 of Figure 2 and looking in the direction of the arrows thereon.

The end of a drive shaft member 10 is shown supported near the universal joint 12 by a center bearing supporting device 14 embodying the features of the present invention.

The center bearing supporting device 14 includes a resilient annular sleeve 16 disposed in concentric spaced relation about the ball bearing member 18, on the drive shaft member 10, and secured thereto by a member 20 bonded to one end of the resilient sleeve or bushing-like member 16 and having an inner flange 22 and snap ring arrangement 24 between which the outer race of the bearing member is held.

The inner race of the bearing member 18 is held on the drive shaft by a generally conventional lock nut arrangement 26.

An annular supporting sleeve member 28 has the other end of the resilient sleeve 16 bonded thereto and is itself secured to a support member 30 which includes a saddle portion 32 within which the supporting sleeve 28 is received and to which it is welded or otherwise secured.

A support bracket 34 is secured as by rivets 36 to the side walls of frame members 37 and 38, which, in a cruciform type frame center section as is suggested by the illustrations, are disposed in relatively close spaced relation. The support bracket 34 is disposed between the frame members above the connecting center section reinforcement plate member 40 and includes means for receiving and locating the support 30 relative thereto.

The support locating means includes having a depending tongue 42 formed from the bracket on the side receiving the bearing supporting subassembly and which acts as a cam surface guiding the support member 30 into position on the bracket. A vertical back wall 44 on the bracket serves as a backstop to prevent the support member from passing on over the supporting ledge of the bracket and a locator slot 46 provided through the bracket just behind the cam guide tongue 42 receives a tab or tongue 48 struck from the edge of the support member.

The support member 30 is also guided into position on the bracket 34 by notches 50 and 52 cut into the depending lip of the bracket on each side of the aforementioned guide tongue 42 (which actually serve to form the tongue member) and disposed to receive threaded bolts 54 and 56 engaged with the bottom wall of the support member. The bolts are pre-threaded into weld nuts 58 and 60 on the support member and have their headed ends depending so as to be engaged with the underside of the bracket ledge as the support plate rides up onto the ledge. It is then a relatively easy matter to tighten the bolts with a wrench to secure the bearing supporting subassembly in position.

It should be noted that the support sleeve 28, as disposed and bonded within the resilient supporting sleeve 16, overlaps the bearing member 18 such that any excessive deflection of the drive shaft and bearing member will engage a part of the resilient sleeve therebetween and serve as a bumper stop.

What is claimed is:

1. Vehicle drive shaft center bearing support means comprising a shaft receiving bearing member, a resilient annular sleeve disposed in concentrac spaced relation about said bearing member, a support member secured to one end of said resilient member and extended therewithin and engaged with said bearing member, an annular sleeve secured in the other end of said resilient member and having a depending support plate secured thereto, means secured to said support plate for mounting said annular sleeve and said resilient member on a supporting structure, said mounting means including a bracket member having a cam surfaced tongue upon which said support plate is received, and cooperating locator means formed within said bracket and from said support plate for assuring proper positioning of the bearing supporting assembly thereon.

2. The vehicle drive shaft center bearing support means of claim 1 wherein said plate supporting annular sleeve is disposed in overlapping relation to said bearing member and part of said resilient member is disposed therebetween to provide a bumper stop against excessive shaft deflection.

3. Vehicle drive shaft center bearing support means including a bracket member receivable between spaced vehicle frame members, support means receivable upon said bracket and including a resilient annular sleeve member having one end secured thereto at one side thereof, a bearing member disposed about said shaft and in spaced concentric relation within said sleeve member, means secured to the other end of said resilient sleeve member for retaining said resilient sleeve and bearing members in the aforementioned spaced concentric relation, and said bracket member including notched recesses and a cam surfaced tongue portion for guiding said bearing support means into securable position upon said bracket and relative to said drive shaft.

References Cited in the file of this patent

UNITED STATES PATENTS

| | | |
|---|---|---|
| 2,551,621 | Michelson | May 8, 1951 |
| 2,857,974 | Heller | Oct. 28, 1958 |